Patented July 24, 1951

2,561,797

UNITED STATES PATENT OFFICE 2,561,797

HORSE-RADISH COMPOSITION AND METHOD OF PRODUCING THE SAME

Ellis I. Huntsinger, Eau Claire, Wis.

No Drawing. Application April 7, 1950,
Serial No. 154,730

8 Claims. (Cl. 99—140)

This invention relates to an improved horseradish product and a process for making the same.

Ground or grated horseradish root has a sharp, pungent flavor, largely due to the presence of mustard oil, which makes it popular as a condiment for various types of food such as meats and seafood. Unfortunately, after exposure to air, the ground root rapidly loses flavor because of the volatilization of the essential oil, and darkens in color because of the presence of oxidizing enzymes. Within several days, therefore, it becomes unattractive in appearance and loses its potency as a condiment.

The object of this invention is to provide a ground horseradish product which retains its natural color and its sharp, pungent flavor and aroma for greatly extended periods of time.

Another object is to provide a ground horseradish condiment of increased nutritional value and superior, smooth flavor.

Still another object is to provide a process for making the improved horseradish product of my invention.

Further objects and advantages will become obvious from the following description and claims.

I have found that coating the particles of ground or grated horseradish with a synthetic cream reduces volatilization of the mustard oil, and oxidation to such an extent that the horseradish remains potent and without discoloration for several months.

The synthetic cream of my invention comprises an emulsified mixture of skim milk, a vegetable oil and a suitable edible, homogenizing or emulsifying agent. Substantially any edible vegetable oil may be used, such as corn oil, cottonseed oil, peanut oil, soybean oil and the like. Lecithin is particularly effective as the homogenizing agent, but other suitable edible homogenizing or emulsifying agents may be employed for my purpose.

The skim milk may be either in liquid or dried form. If dried skim milk is used, it should be dissolved in water prior to admixture with the vegetable oil and sufficient homogenizing agent to make a smooth, stable cream.

The following is illustrative of a typical formulation of the synthetic cream, although it will be understood that the proportions of the ingredients may be varied. Fifty (50) pounds of dried skim milk are dissolved in sufficient water to make up about twenty-five (25) gallons. To this is added about five (5) gallons of corn oil and about two and one-half (2½) pounds of lecithin. The mixture is stirred or agitated until it has a smooth creamy consistency.

The synthetic cream is then admixed with the freshly ground horseradish root. The horseradish preferably in accordance with the usual practice, contains sufficient vinegar to prevent bacteriological deterioration. In general, I have found that about five (5) percent of the cream gives highly satisfactory results both as to texture and preservation of flavor and color. Smaller amounts will effectively reduce the rate of mustard oil volatilization and oxidation, but will not impart as creamy or smooth a texture to the condiment. Larger proportions of the cream may, of course, be used if desired and will increase the creamy texture of the horseradish.

The cream coats the horseradish particles and greatly reduces the rate of volatilization of the mustard oil so that the condiment retains its pungency relatively undiminished for several months. It also prevents any appreciable penetration of air and thus keeps at a minimum the oxidative reactions which cause discoloration and darkening. The horseradish retains its natural color for months despite exposure to the atmosphere. Furthermore, the synthetic cream imparts a superior flavor and a smoothness which are highly desirable and substantially increases the nutritive values of the condiment.

Although this invention has been described with reference to illustrative embodiments thereof, it will be apparent to those skilled in the art that modifications may be made in the kinds and proportions of materials employed and that the principles of the invention may be embodied in other forms but within the scope of the appended claims.

Having thus described my invention, I claim:

1. A horseradish composition comprising comminuted horseradish root in admixture with a cream comprising skim milk, vegetable oil and a homogenizing agent, said cream serving to retard discoloration and loss of flavor.

2. A horseradish composition comprising comminuted horseradish root in admixture with a cream comprising skim milk, vegetable oil and lecithin, said cream serving to retard discoloration and loss of flavor.

3. A horseradish composition comprising comminuted horseradish root in admixture with a cream comprising skim milk, corn oil and lecithin, said cream serving to retard discoloration and loss of flavor.

4. A horseradish composition comprising comminuted horseradish root in admixture with about 5% of a cream comprising about 5 parts by volume of skim milk, 1 part by volume of corn oil, and lecithin in sufficient amount to emulsify said mixture of skim milk and corn oil, said cream serving to retard discoloration and loss of flavor.

5. A method for making a horseradish composition comprising comminuting horseradish root and admixing said comminuted horseradish with a cream comprising skim milk, vegetable oil and a homogenizing agent, said cream serving to retard discoloration and loss of flavor.

6. A method of making a horseradish composition comprising comminuting horseradish root and admixing said comminuted horseradish with a cream comprising skim milk, vegetable oil and lecithin, said cream serving to retard discoloration and loss of flavor.

7. A method for making a horseradish composition comprising comminuting horseradish root and admixing said comminuted horseradish with a cream comprising skim milk, corn oil and lecithin, said cream serving to retard discoloration and loss of flavor.

8. A method for making a horseradish composition comprising comminuting horseradish root, admixing said comminuted horseradish with about 5% of a cream comprising about 5 parts by volume of skim milk, 1 part by volume of corn oil and lecithin in sufficient amount to emulsify said mixture of skim milk and corn oil, said cream serving to retard discoloration and loss of flavor.

ELLIS I. HUNTSINGER.

REFERENCES CITED

The following references are of record in the file of this patent:

UNITED STATES PATENTS

| Number | Name | Date |
|---|---|---|
| 704,662 | Oppermann | July 15, 1902 |
| 2,246,528 | Musher | June 24, 1941 |
| 2,369,847 | Olsen et al. | Feb. 20, 1945 |